(12) United States Patent
Katou

(10) Patent No.: US 9,110,361 B2
(45) Date of Patent: Aug. 18, 2015

(54) ILLUMINATION OPTICAL SYSTEM AND PROJECTION DISPLAY APPARATUS

(75) Inventor: Atsushi Katou, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 214 days.

(21) Appl. No.: 13/639,481

(22) PCT Filed: May 28, 2010

(86) PCT No.: PCT/JP2010/059067
§ 371 (c)(1),
(2), (4) Date: Oct. 4, 2012

(87) PCT Pub. No.: WO2011/148499
PCT Pub. Date: Dec. 1, 2011

(65) Prior Publication Data
US 2013/0033685 A1 Feb. 7, 2013

(51) Int. Cl.
*G03B 21/28* (2006.01)
*F21V 7/00* (2006.01)
(Continued)

(52) U.S. Cl.
CPC .......... *G03B 21/2033* (2013.01); *G02B 6/0018* (2013.01); *G02B 6/4298* (2013.01);
(Continued)

(58) Field of Classification Search
CPC .......... G02B 27/0905; G02B 27/0977; G02B 27/0994; G02B 27/143; G02B 6/4212; G02B 6/4298; G02B 6/0018; G03B 21/2013; G03B 21/2033; G03B 33/06
USPC .......... 353/81, 94, 20, 98; 362/231, 234, 238, 362/235; 348/E9.027
See application file for complete search history.

(56) References Cited

U.S. PATENT DOCUMENTS

| 5,626,409 A | 5/1997 | Nakayama et al. |
| RE36,850 E | 9/2000 | Nakayama et al. |

(Continued)

FOREIGN PATENT DOCUMENTS

| CN | 1573513 A | 2/2005 |
| CN | 1662772 A | 8/2005 |

(Continued)

OTHER PUBLICATIONS

International Search Report in PCT/JP2010/059067 dated Jul. 6, 2010(English Translation Thereof).

(Continued)

*Primary Examiner* — Christina Riddle
*Assistant Examiner* — Christopher Lamb, II
(74) *Attorney, Agent, or Firm* — McGinn IP Law Group, PLLC

(57) ABSTRACT

Disclosed is an illumination optical system that includes: two solid-state light sources (11 and 12); first light guide (21) configured to guide light emitted from one solid-state light source in a first direction; second light guide (22) configured to guide light emitted from the other solid-state light source in a second direction different from the first direction; and optical path conversion units (31 and 32) including total reflection surfaces for totally reflecting the lights guided by the first light guide and the second light guide to enter the lights into third light guide (50). A projection display apparatus that uses the illumination optical system thus configured can enter light emitted from a plurality of light sources straight into an image forming element by one optical system.

14 Claims, 7 Drawing Sheets

(51) Int. Cl.
    *G03B 21/20*     (2006.01)
    *G02B 27/09*     (2006.01)
    *G03B 33/06*     (2006.01)
    *G02B 27/14*     (2006.01)
    *F21V 8/00*     (2006.01)
    *G02B 6/42*     (2006.01)

(52) U.S. Cl.
    CPC ........ *G02B27/0905* (2013.01); *G02B 27/0977* (2013.01); *G02B 27/0994* (2013.01); *G02B 27/143* (2013.01); *G03B 21/2013* (2013.01); *G03B 33/06* (2013.01); *G02B 6/4214* (2013.01)

(56) References Cited

U.S. PATENT DOCUMENTS

| | | | |
|---|---|---|---|
| 6,120,152 | A | 9/2000 | Nakayama et al. |
| 6,309,073 | B1 | 10/2001 | Nakayama et al. |
| 6,869,206 | B2 * | 3/2005 | Zimmerman et al. ........ 362/310 |
| 7,033,056 | B2 * | 4/2006 | Andersen et al. ............. 362/554 |
| 7,645,042 | B2 * | 1/2010 | Takeda et al. .................... 353/37 |
| 2002/0057420 | A1 | 5/2002 | Nakayama et al. |
| 2005/0018149 | A1 | 1/2005 | Takeda et al. |
| 2006/0044833 | A1 | 3/2006 | Li |
| 2006/0077353 | A1 | 4/2006 | Wu |
| 2006/0078266 | A1 | 4/2006 | Wu et al. |
| 2006/0114417 | A1 | 6/2006 | Lee et al. |
| 2008/0239526 | A1 | 10/2008 | Takeda et al. |
| 2009/0129118 | A1 * | 5/2009 | Li ................................ 362/615 |
| 2011/0090464 | A1 * | 4/2011 | Jhang et al. ..................... 353/31 |

FOREIGN PATENT DOCUMENTS

| | | |
|---|---|---|
| CN | 1673851 A | 9/2005 |
| JP | 05-072628 A | 3/1993 |
| JP | 2002-372684 A | 12/2002 |
| JP | 2005-017338 A | 1/2005 |
| JP | 2005-531033 A | 10/2005 |
| JP | 2006-106682 A | 4/2006 |
| JP | 2006-106683 A | 4/2006 |
| JP | 2006-154813 A | 6/2006 |
| JP | 2007-010972 A | 1/2007 |

OTHER PUBLICATIONS

Chinese Office Action dated Nov. 4, 2014 with an English translation thereof.

* cited by examiner

ILLUMINATION OPTICAL SYSTEM AND PROJECTION DISPLAY APPARATUS

TECHNICAL FIELD

The present invention relates to a projection display apparatus and an illumination optical system mounted on the projection display apparatus.

BACKGROUND ART

In recent years, as a light source for the projection display apparatus, attention has been focused on a solid-state light source such as a LED (light-emitting device) or a semiconductor laser. The projection display apparatus equipped with the solid-state light source includes an illumination optical system that includes a solid-state light source and an optical element configured to guide light emitted from the solid-state light source, an image forming element configured to modulate the light guided by the illumination optical system, and a projection optical system configured to project the light modulated by the image forming element.

The light emission efficiency of the solid-state light source has been improved year by year. For example, even a LED having light emission efficiency exceeding 150[lm/W] is known. However, for a light source of the projection display apparatus required to project a high-luminance image, not only the light emission efficiency but also a light emission amount are important factors.

In this regard, even when one LED module each is prepared for each of the respective colors R, Q, and B, the sum of the amount of light emitted by these three LED modules cannot reach the amount of light emitted by a conventional discharge lamp. A LED module (may be referred to as "high power LED") having power consumption exceeding several tens W is also known. However, even when one high power LED module each is prepared for each of the respective colors R, G, and B, the sum of the amount of light emitted by these three high power LED modules cannot reach the amount of light emitted by the conventional discharge lamp.

Thus, by preparing a plurality of LED modules for each of the R, G, and B colors, the sum of light emission efficiencies may be increased.

CITATION LIST

Patent Literature 1: JP2006-106683A
Patent Literature 2: JP2006-106682A

SUMMARY OF INVENTION

Problems to be Solved by Invention

However, when a plurality of LED modules is prepared for each of the R, G, and B colors, the following problems occur.

As shown in FIG. 1A, the LED module including the high power LED includes metal substrate 100 made of copper or aluminum, a light emitting element (LED chip 101) mounted roughly on the center of metal substrate 100, a cover glass (not shown) for protecting LED chip 101, and a pair of electrodes 102a and 102b extending from metal substrate 100. In other words, LED chip 101 is mounted on metal substrate 100 that is larger than LED chip 101.

Accordingly, as shown in FIG. 1B, when two LED modules are arrayed, the center of LED chip 101 on one of the LED modules and the center of LED chip 101 on the other of the LED modules are separated from each other by distance T. That is, the centers of the two LED chips (light sources) cannot coincide with each other. In other words, the centers of all the light sources cannot be arranged on an optical axis. As a result, a plurality of light sources is discretely present for one image forming element. The "optical axis" means the line normal to the image forming element surface.

Thus, an optical system must be disposed between each LED module and the image forming element, causing an increase of the number of components or enlargement of the illumination optical system.

Further, even when the optical system is disposed between each LED module and the image forming element, light emitted from the plurality of discretely arranged light sources obliquely enters the image forming element. Consequently, light use efficiency is reduced.

A single secondary light source may be formed by a light guide whose size is sufficient to cover an area including the light emission surfaces of two LED chips 101 arranged as shown in FIG. 1B. However, since two LED chips 101 are separated from each other as described above, a very large light guide is necessary, and the illumination optical system is enlarged.

The metal substrate constituting the LED module also functions as a heat sink for releasing heat generated from the LED chip. This requires a sufficient surface area in the metal substrate. Especially in the metal substrate constituting the high power LED of a large heat generation amount, a larger surface area is required. As a result, the metal substrate constituting a high power LED is larger than that constituting a normal LED module. Thus, when two high power LEDs are arrayed, distance T is increased, causing the aforementioned problem to be conspicuous.

Solution to Problem

Lights emitted from a plurality of light sources discretely arranged for one image forming element are guided to a common light guide to form a single secondary light source. Further, total reflection having no light loss is used as optical path conversion carried out to guide the lights emitted from the plurality of light sources to the common light guide.

Effects of Invention

The lights emitted from the plurality of light sources can be guided to the image forming element by one optical system. Further, lights emitted from a plurality of light sources can be entered straight into the image forming element.

DESCRIPTION OF EMBODIMENTS

First Exemplary Embodiment

Figure 2:
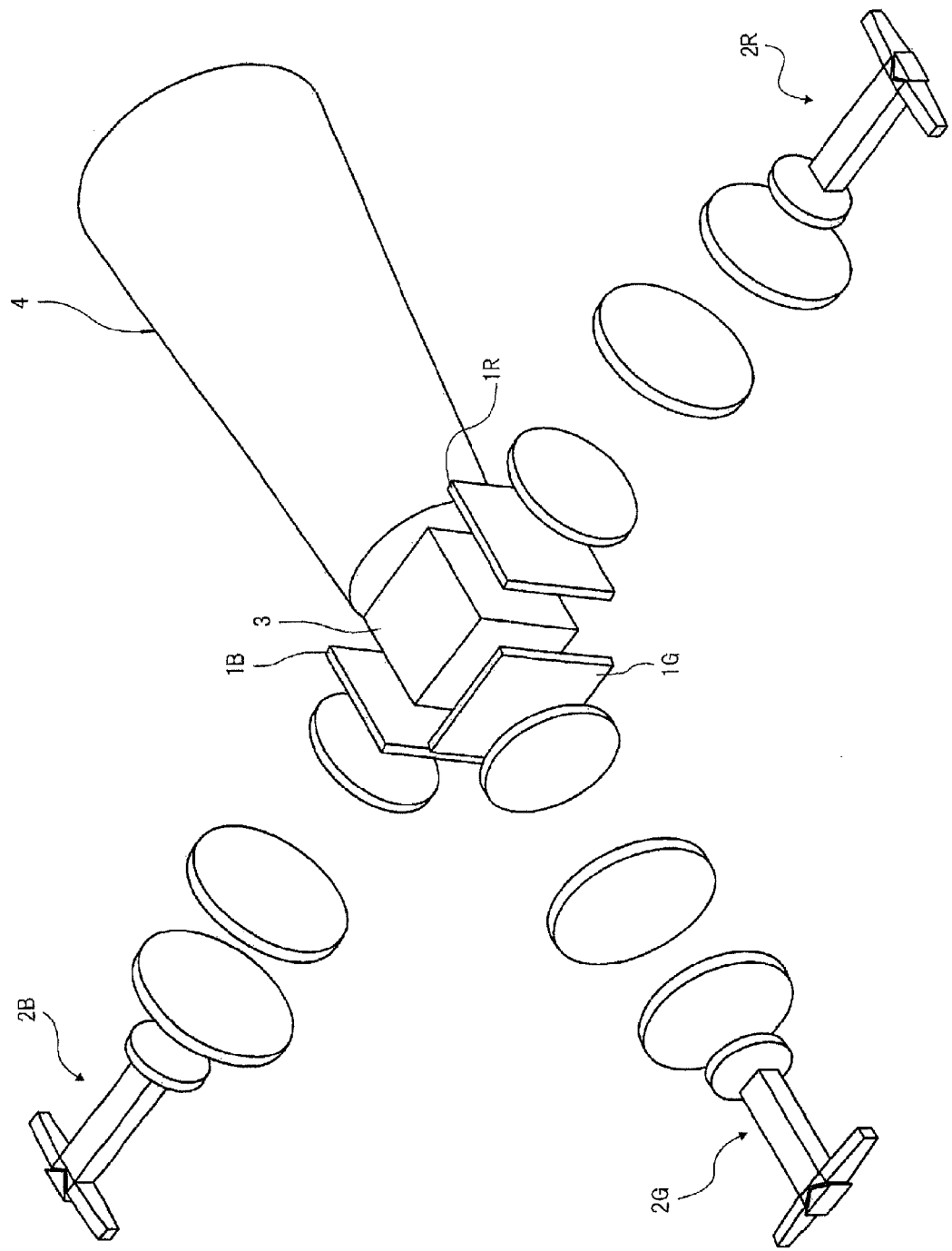
FIG. 2 is a schematic view showing the internal structure of a projection display apparatus according to a first exemplary embodiment.

A projection display apparatus according to the first exemplary embodiment of the present invention will be described. FIG. 2 is a schematic view showing a part of the internal structure of the projection display apparatus according to this exemplary embodiment. The projection display apparatus according to this exemplary embodiment includes image forming elements (liquid crystal panels 1R, 1G and 1B) prepared for the respective colors of R, G, and B, first to third illumination optical systems 2R, 3G, and 2B prepared for the respective liquid crystal panels, a cross dichroic prism (XDP 3) combining image lights generated by the liquid crystal panels, and projection optical system 4 projecting full-color image light combined by XPD 3.

Needless to say, the projection display apparatus according to this exemplary embodiment includes, in addition to the components shown in FIG. 2, a component (not shown) necessary for forming an image based on an input image signal and projecting the formed image.

Next, the illumination optical system that is a feature of the projection display apparatus according to this exemplary embodiment will be described in detail. It should be noted that three illumination optical systems 2R, 2G, and 2B shown in FIG. 2 are substantially similar in configuration. Thus, only first illumination optical system 2R will be described, while description of other illumination optical systems 2G and 2B will be omitted.

Figure 3:
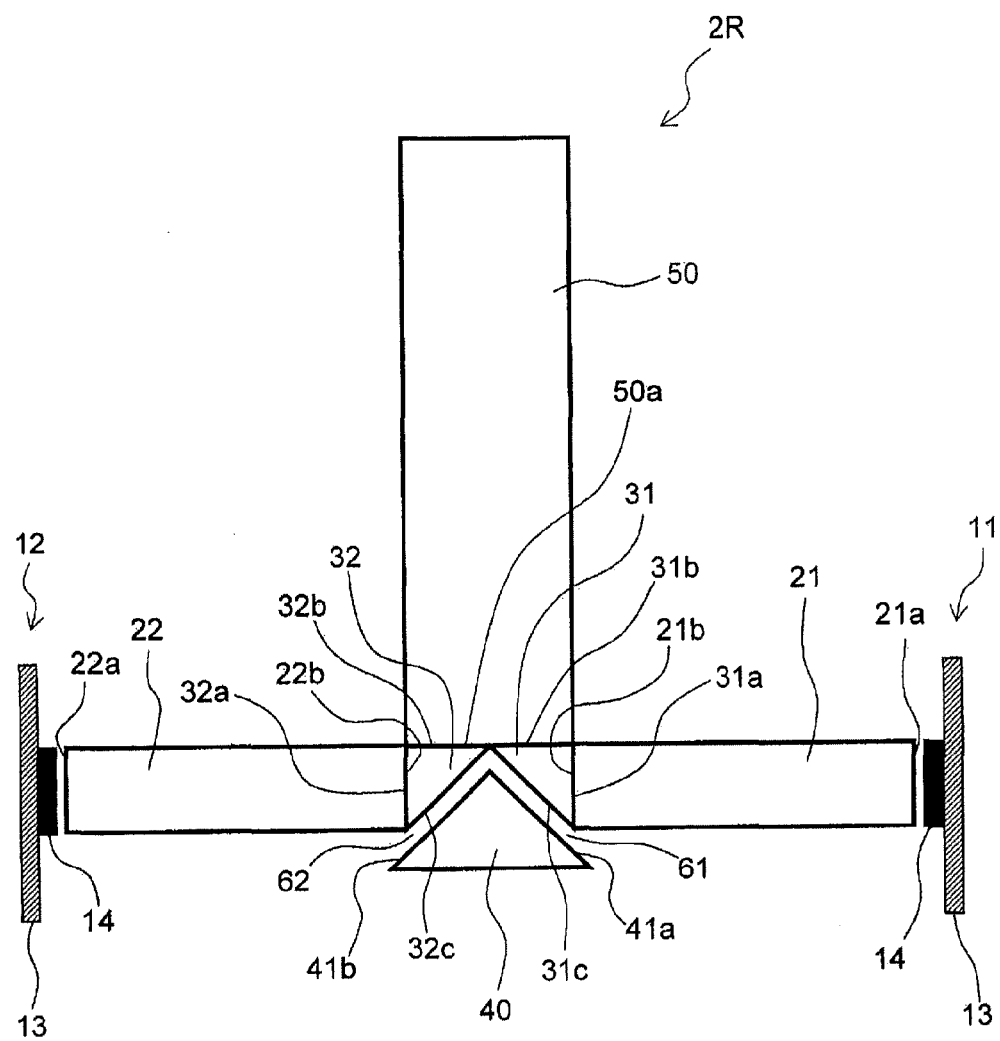
FIG. 3 is a plan view showing a first illumination optical system shown in FIG. 2.
Figure 4:
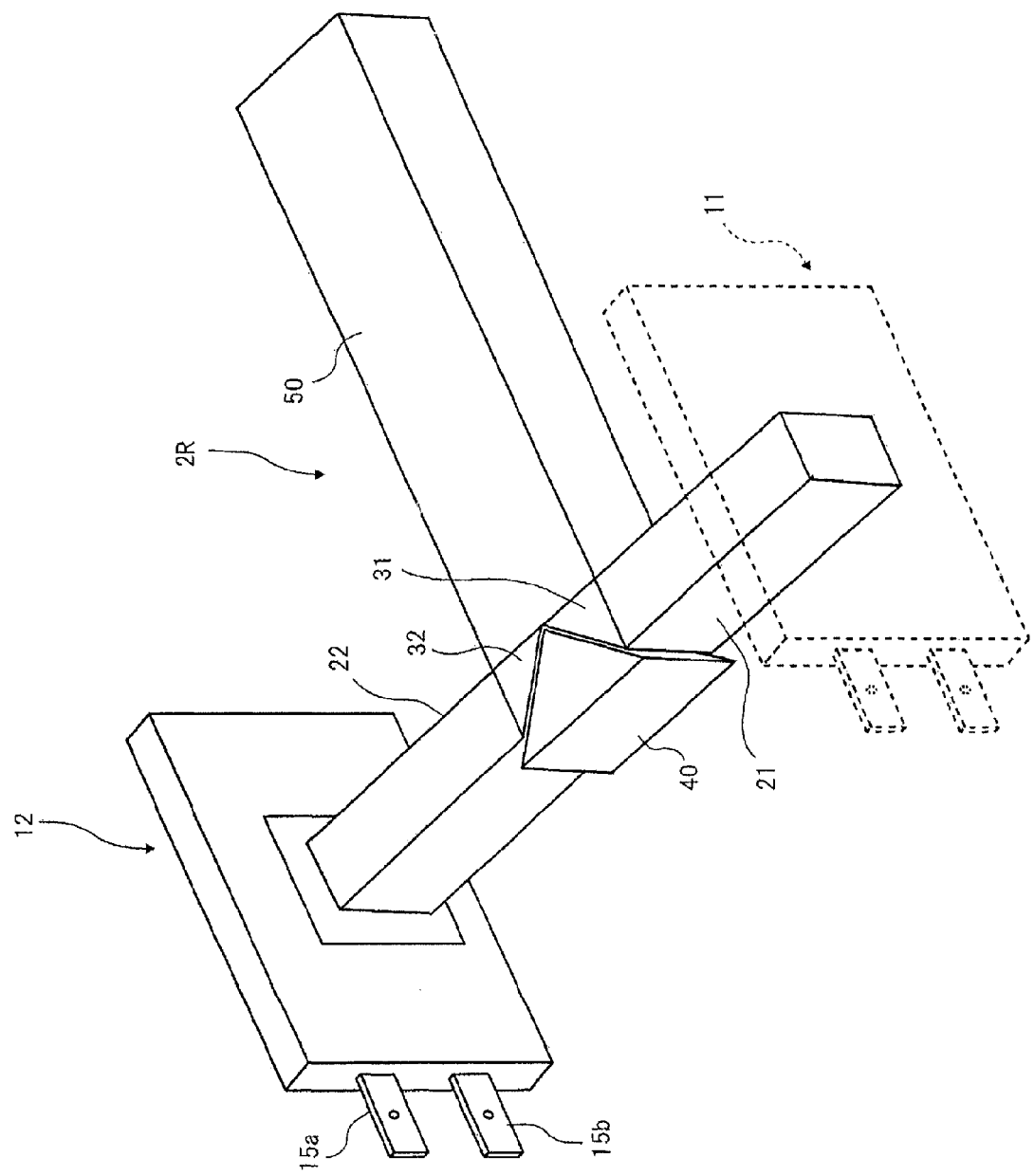
FIG. 4 is a perspective view showing the first illumination optical system shown in FIG. 2.

FIG. 3 is a plan view showing first illumination optical system 2R. FIG. 4 is a perspective view showing first illumination optical system 2R.

As shown in FIG. 3, first illumination optical system 2R has a roughly T-shaped planar shape as a whole. Specifically, first illumination optical system 2R includes first LED module 11 and second LED module 12 arranged oppositely to each other. First light guide 21 and second light guide 22 are spaced in a line between first LED module 11 and second LED module 12. First optical path conversion unit 31 and second optical path conversion unit 32 are arranged between first light guide 21 and second light guide 22. Reflection unit 40 is disposed between first optical path conversion unit 31 and second optical path conversion unit 32. Third light guide 50 is disposed on the opposite side of the reflection unit 40 sandwiching optical path conversion units 31 and 32.

Figure 1A:
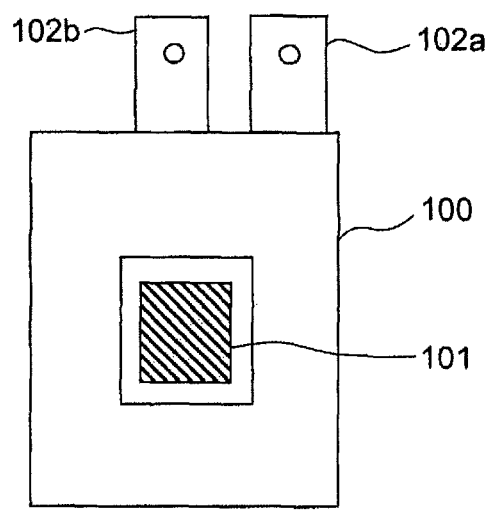
FIG. 1A is a plan view showing a LED module.
Figure 1B:
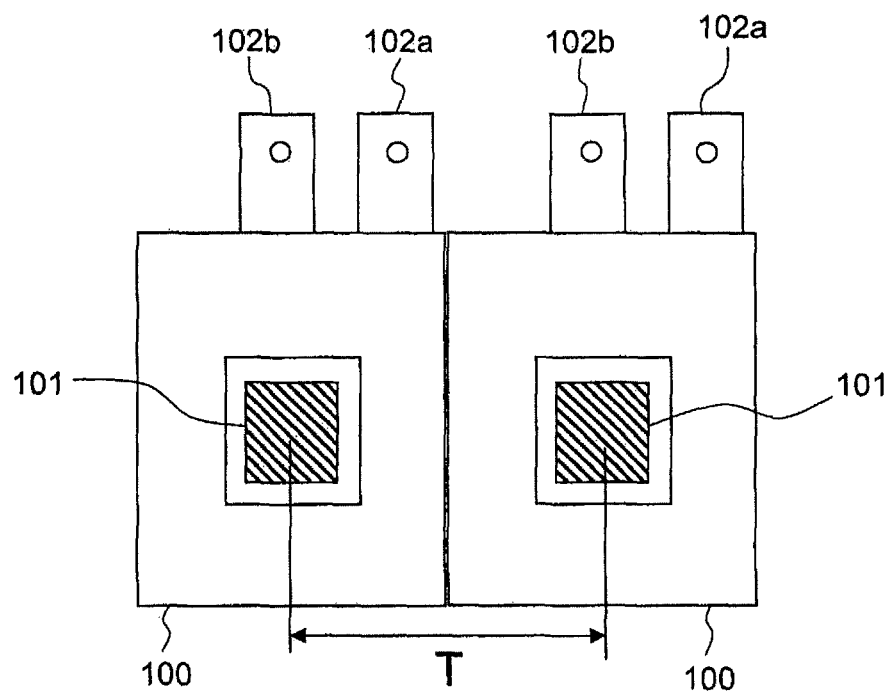
FIG. 1B is a plan view showing two LED modules arranged adjacently to each other.

First LED module 11 and second LED module 12 are high power LEDs similar in structure to the LED module shown in FIG. 1A. Specifically, each of LED modules 11 and 12 includes metal substrate 13, LED chip 14 mounted on metal substrate 13, and a cover glass (not shown) that covers LED chip 14. Further, a pair of electrodes 15a and 15b (FIG. 4) extends from one side of metal substrate 13. The color of light emitted from first LED module 11 and second LED module 12 is red.

The light emission surface of first LED module 11 (LED chip 14) faces light incident surface 21a of first light guide 21 via a very small gap. On the other hand, the light emission surface of second LED module 12 (LED chip 14) faces light incident surface 22a of second light guide 22 via a very small gap. To reduce light loss, it is desirable for the gap between the light emission surface of the LED chip and the light incidence surface of the light guide to be as narrow as possible. However, to generate refraction during incidence on the light guide, the gap must be larger than the light wavelength.

First optical path conversion unit 31 is bonded to light exit surface 21b of first light guide 21. On the other hand, second optical path conversion unit 32 is bonded to light exit surface 22b of second light guide 22.

Specifically, first optical path conversion unit 31 is a right angle prism that includes two surfaces (first surface 31a and second surface 31b) orthogonal to each other and a slope (third surface 31c) over first surface 31a and second surface 31b. First surface 31a is bonded to light exit surface 21b of first light guide 21 by an optical adhesive.

Second optical path conversion unit 32 is a right angle prism that includes two surfaces (first surface 32a and second surface 32b) orthogonal to each other and a slope (third surface 32c) over first surface 32a and second surface 32b. First surface 32a is bonded to light exit surface 22b of second light guide 22 by an optical adhesive.

Further, second surface 31b of first optical path conversion unit 31 and second surface 32b of second optical path conversion unit 32 are bonded to light incident surface 50a of third light guide 50 by an optical adhesive.

In other words, first light guide 21, second light guide 22, first optical path conversion unit 31, second optical path conversion unit 32, and third light guide 50 are integrated.

Figure 5:
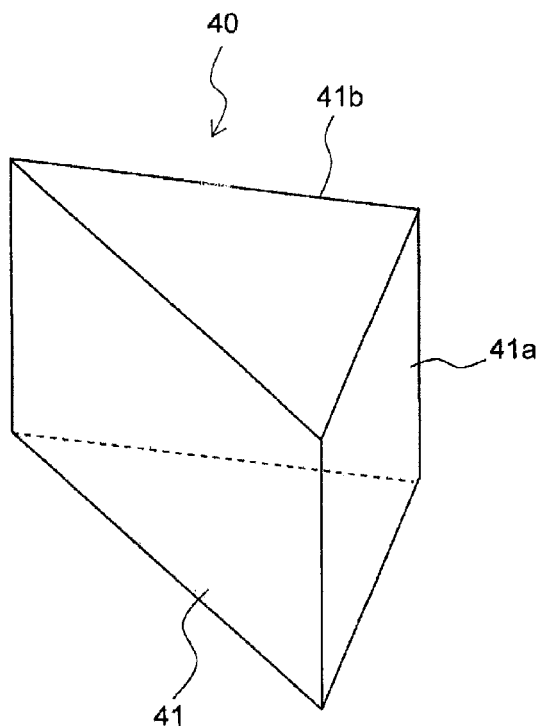
FIG. 5 is an enlarged view showing a reflection unit shown in FIGS. 3 and 4.

Next, reflection unit 40 will be described. FIG. 5 is an enlarged perspective view showing reflection unit 40. Reflection unit 40 includes triangle columnar base member 41, and a metal film (not shown) formed as a reflection film on two continuous side surfaces 41a and 41b of base member 41. In short, reflection unit 40 includes two reflection surfaces 41a and 41b. Reflection unit 40 is disposed between first optical path conversion unit 31 and second optical path conversion unit 32 so that one reflection surface 41a can face third surface 31c of first optical path conversion unit 31 via a very small gap and other reflection surface 41b can face third surface 32c of second optical path conversion unit 32 via a very small gap (FIG. 3). In other words, air layer 61 is formed between third surface 31c of first optical path conversion unit 31 and reflection surface 41a, and air layer 62 is formed between third surface 32c of second optical path conversion unit 32 and reflection surface 41b.

Figure 6:
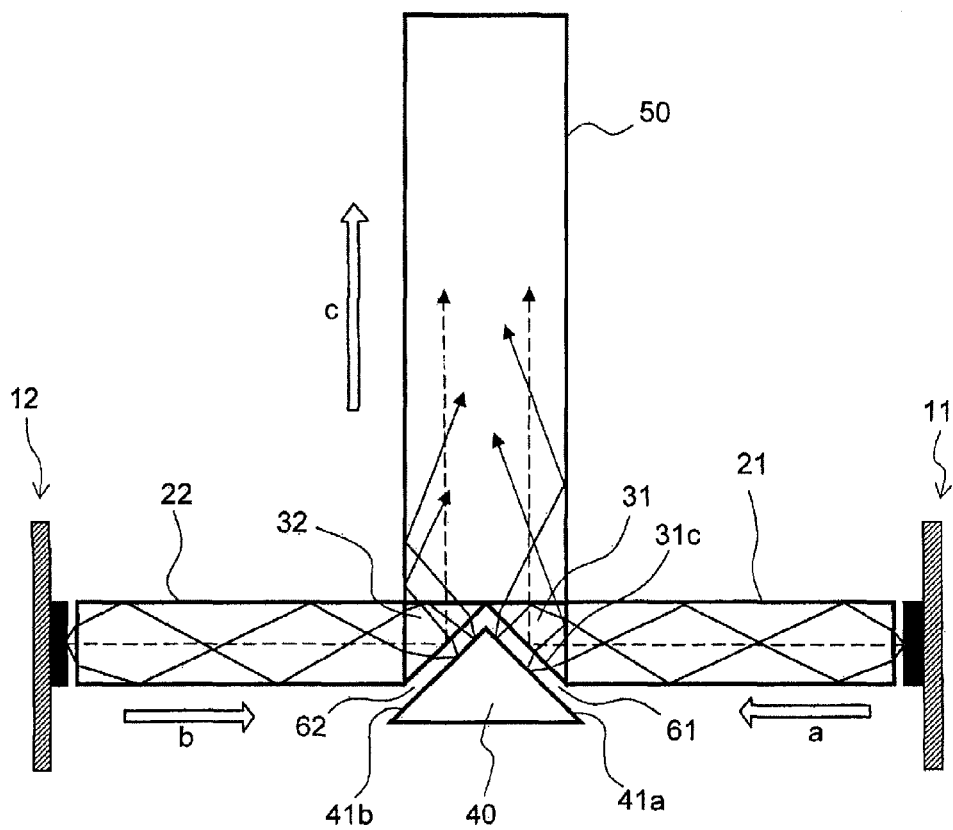
FIG. 6 is a schematic view showing the motion of light in the illumination optical system shown in FIGS. 3 and 4.

Next, the operation of first illumination optical system 2R will be described referring to FIGS. 3 and 6. The light emitted from first LED module 11 enters first light guide 21 from light incident surface 21a. The light entered into first light guide 21 is repeatedly reflected totally to travel through first light guide 21, and then exits from light exit surface 21b. In other words, the light emitted from first LED module 11 is guided in a first direction (the direction of arrow "a" shown in FIG. 6) by first light guide 21.

The light output from light exit surface 21b of first light guide 21 enters first optical path conversion unit 31 bonded to light exit surface 21b. Specifically, the light output from light exit surface 21b enters first optical path conversion unit 31 from first surface 31a of first optical path conversion unit 31, and then enters third surface 31c of first optical path conversion unit 31.

Air layer 61 is present between third surface 31c of first optical path conversion unit 31 and reflection surface 41a of reflection unit 40. In other words, third surface 31c of first optical path conversion unit 31 is a boundary surface between two media different from each other in refractive index. Accordingly, light that has entered third surface 31c at an angle equal to or larger than a critical angle is totally reflected on third surface 31c.

The light totally reflected on third surface 31c of first optical path conversion unit 31 exits from second surface 31b of first optical path conversion unit 31 to enter third light guide 50.

On the other hand, light that has entered third surface 31c at an angle smaller than the critical angle is transmitted through third surface 31c. The light transmitted through third surface 31c is reflected on reflection surface 41a of reflection unit 40 to reenter first optical path conversion unit 31. As in the case of the light totally reflected on third surface 31c, the light that has reentered first optical path conversion unit 31 exits from second surface 31b to enter third light guide 50.

That is, all the lights guided by first light guide 21 to enter first optical path conversion unit 31 are finally guided to third light guide 50. The light entered into third light guide 50 is repeatedly reflected totally to travel through third light guide 50, and then exits from the light exit surface. In other words, the light entered into third light guide 50 is guided in a third direction (the direction of arrow "c" shown in FIG. 6) by third light guide 50.

On the other hand, the light emitted from second LED module 12 enters second light guide 22 from light incident surface 22a. The light entered into second light guide 22 is repeatedly reflected totally to travel through second light guide 22, and then exits from light exit surface 22b. In other words, the light emitted from second LED module 12 is guided in a second direction (the direction of arrow "b" shown in FIG. 6) by second light guide 22.

The light output from light exit surface 22b of second light guide 22 enters second optical path conversion unit 32 bonded to light exit surface 22b. Then, by the same principle as that of the aforementioned case, all the lights that are guided by second light guide 22 to enter second optical path conversion unit 32 are finally guided to third light guide 50. The light entered into third light guide 50 is repeatedly reflected totally to travel through third light guide 50, and then exits from the light exit surface. In other words, the light entered into third light guide 50 is guided in the third direction (the direction of arrow "c" shown in FIG. 6) by third light guide 50.

In short, the lights emitted from the two solid-state light guides are guided to the common light guide to form a single secondary light source.

First light guide 21 and second light guide 22 according to this exemplary embodiment are square columnar. However, they can be square tubular. As materials for first light guide 21 and second light guide 22, optical glasses such as BK7 or optical resins can be used. Similarly, as materials for first optical path conversion unit 31, second optical path conversion unit 32, and base member 41 of reflection unit 40, optical glasses such as BK7 or optical resins can be used. Desirably, however, for optical path conversion units 31 and 32, materials higher in refractive index than those for light guides 21, 22, and 50 are used. Desirably, materials equal in refractive index are used for three light guides 21, 22, and 50.

As described at the outset, three illumination optical systems 2R, 2G, and 2B shown in FIG. 2 are substantially similar in configuration. However, colors of the lights emitted from the two LED modules constituting second illumination optical system 2G are green, while colors of the lights emitted from the two LED modules constituting third illumination optical system 2B are blue. It should be noted that one illumination optical system can be configured by using two LED modules for emitting lights of different colors.

As the metal film constituting reflection surfaces 41a and 41b of reflection unit 40, an aluminum film, a gold film, or a silver film having high reflection efficiency is desirable. Needless to say, a dielectric multilayer film can be used.

Figure 7:
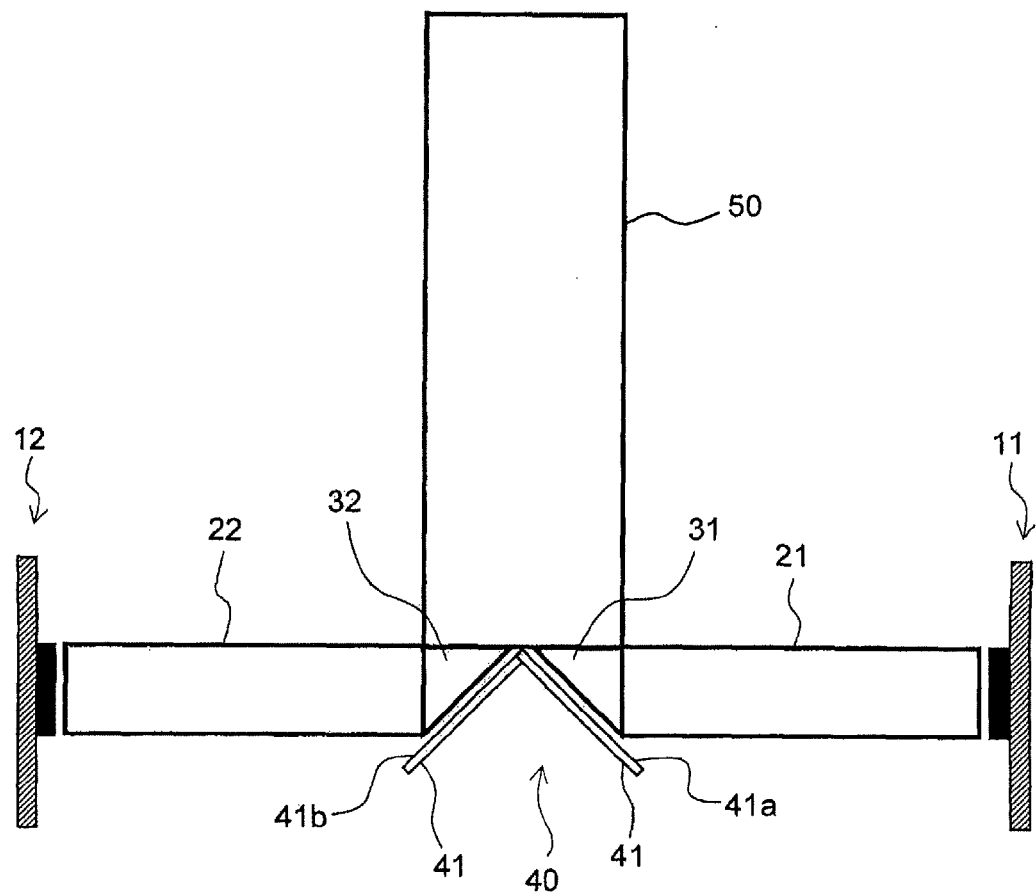
FIG. 7 is a plan view showing a modified example of the illumination optical system shown in FIGS. 3 and 4.

As shown in FIG. 7, reflection surfaces 41a and 41b can be formed by a metal film formed on the surface of plate-shaped base member 41. The number of plate-shaped base members 41 can be one or a plurality. When a plurality of plate-shaped base members 41 is used, the plurality of plate-shaped base members 41 can be integrated or independent.

In this exemplary embodiment, first optical path conversion unit 31 and second optical path conversion unit 32 are integrated via third light guide 50. However, first optical path conversion unit 31 and second optical path conversion unit 32 can be integrally formed, and integrally formed first optical path conversion unit 31 and second optical path conversion unit 32 can be bonded to third light guide 50.

Second Exemplary Embodiment

Figure 8:
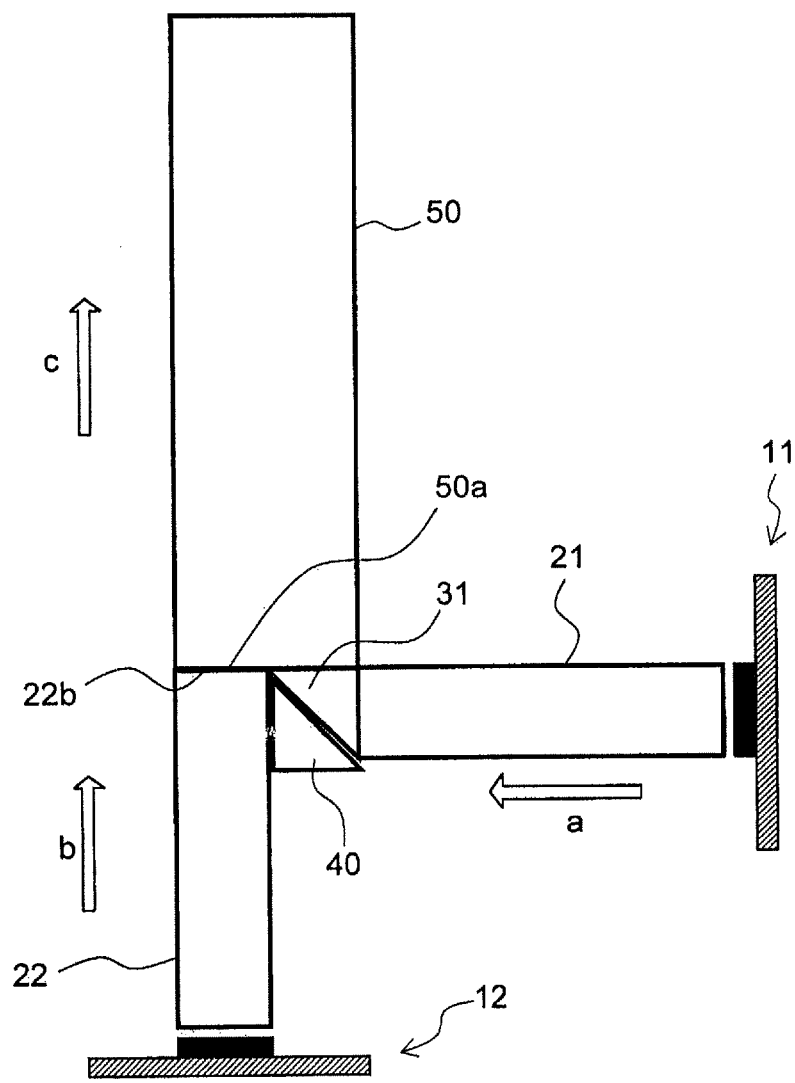
FIG. 8 is a plan view showing an illumination optical system according to a second exemplary embodiment.

At least one of three illumination optical systems 2R, 2G, and 2B shown in FIG. 2 can be replaced with illumination optical system 2 shown in FIG. 8.

Hereinafter, the illumination optical system shown in FIG. 8 will be described. Illumination optical system 2 shown in FIG. 8 is basically similar in configuration to illumination optical system 2R shown in FIG. 3.

However, illumination optical system 2 shown in FIG. 8 and illumination optical system 2R shown in FIG. 3 are different from each other in the relative positional relationship between first LED module 11 and second LED module 12. In other words, illumination optical system 2 shown in FIG. 8 and illumination optical system 2R shown in FIG. 3 are different from each other in the relative positional relationship between second LED module 12 and third light guide 50.

In other words, in illumination optical system 2R shown in FIG. 3, first LED module 11 and second LED module 12 face each other. On the other hand, in illumination optical system 2 shown in FIG. 8, first LED module 11 and second LED module 12 do not face each other. Specifically, in illumination optical system 2 shown in FIG. 8, the light emission surface of second LED module 12 faces the light incident surface of third light guide 50. Accordingly, to enter light emitted from second LED module 12 into third light guide 50, it is not necessary to change the traveling direction of the light emitted from second LED module 12. Thus, in illumination optical system 2 shown in FIG. 8, second optical path conversion unit 32 shown in FIG. 3 is omitted. In illumination optical system 2 shown in FIG. 8, light exit surface 22b of second light source 22 is bonded to light incident surface 50a of third light guide 50.

In illumination optical system 2 shown in FIG. 8, light emitted from first LED module 11 is guided in a first direction (the direction of arrow "a" shown in FIG. 8) by first light guide 21. All the lights guided by first light guide 21 finally enter third light guide 50 to be guided in a third direction (the direction of arrow "c" shown in FIG. 8). A reason for the entry of all the lights guided by first light guide 21 into third light guide 50 is as described above.

On the other hand, the light emitted from second LED module 12 is guided in a second direction (the direction of arrow "b" shown in FIG. 8) by second light guide 22. The light guided in the second direction by second light guide 22 exits from light exit surface 22b of second light guide 22. All the lights output from light exit surface 22b of second light guide 22 enter third light guide 50 from light incident surface 50a of third light guide 50 bonded to light exit surface 22b. The lights entered into third light guide 50 are guided in a third direction by third light guide 50.

In other words, in illumination optical system 2 shown in FIG. 8, the light guiding direction of second light guide 22 and the guiding direction of third light guide 50 are similar, while the light guiding direction of first light guide 21 and the guiding direction of third light guide 50 are different.

However, as in the aforementioned case, in illumination optical system 2 shown in FIG. 8, the lights emitted from the two solid-state light guides are guided to the common light guide to form a single secondary light source.

The solid-state light sources according to the present invention include a semiconductor laser and an organic EL (electroluminescence). The image forming elements according to the present invention include a DMD (digital micromirror device).

REFERENCE NUMERALS 1R, 1G, 1B Liquid Crystal Panel
2R, 2G, 2B Illumination Optical System
11, 12 LED Module
21, 22, 50 Light Guide
31, 32 Optical Path Conversion Unit
31c, 32c Third Surface (total reflection surface)
40 Reflection Unit
41a, 41b Reflection Surface

What is claimed is:

1. An illumination optical system, comprising:
two solid-state light sources;
a first light guide configured to guide light emitted from one of the two solid-state light sources in a first direction;
a second light guide configured to guide light emitted from another one of the two solid-state light sources in a second direction different from the first direction; an optical path conversion unit including a total reflection surface for totally reflecting the lights guided by the first light guide and the second light guide to enter the lights into a third light guide; wherein
an incident light that enters the total reflection surface at an angle equal to or larger than a critical angle is totally reflected on the total reflection surface and incident light that enters the total reflection surface at an angle less than the critical angle is transmitted through the total reflection surface; and
a reflection unit disposed oppositely to the total reflection surface via an air layer and
configured to reenter light transmitted through the total reflection surface into the optical path conversion unit.

2. The illumination optical system according to claim 1, further comprising:
a first optical path conversion unit that includes a first total reflection surface for totally reflecting the light emitted from the first light guide; and
a second optical path conversion unit that includes a second total reflection surface for totally reflecting the light emitted from the second light guide.

3. The illumination optical system according to claim 2, further comprising:
a first reflection surface disposed oppositely to the first total reflection surface via an air layer and configured to reenter light transmitted through the first total reflection surface into the first optical path conversion unit; and
a second reflection surface disposed oppositely to the second total reflection surface via an air layer and configured to reenter light transmitted through the second total reflection surface into the second optical path conversion unit.

4. The illumination optical system according to claim 2, wherein a refractive index of the optical path conversion unit is higher than any of those of the first light guide and the second light guide.

5. The illumination optical system according to claim 1, wherein a refractive index of the optical path conversion unit is higher than any of those of the first light guide and the second light guide.

6. The illumination optical system according to claim 5, wherein the refractive index of the first light guide and the refractive index of the second light guide are equal to each other.

7. A projection display apparatus, comprising:
an image forming element;
an illumination optical system configured to illuminate the image forming element; and
a projection optical system configured to project image light formed by the image forming element,
wherein the illumination optical system is the illumination optical system according to claim 1.

8. An illumination optical system, comprising:
two solid-state light sources;
a first light guide configured to guide light emitted from one of the two solid-state light sources in a first direction;
a second light guide configured to guide light emitted from another one of the two solid-state light sources in a second direction different from the first direction;
an optical path conversion unit including a total reflection surface for totally reflecting the lights guided by the first light guide and the second light guide to enter the lights into a third light guide; wherein
an incident light that enters the total reflection surface at an angle equal to or larger than a critical angle is totally reflected on the total reflection surface and incident light that enters the total reflection surface at an angle less than the critical angle is transmitted through the total reflection surface; and
a reflection unit disposed oppositely to the total reflection surface via an air layer and
configured to reenter light transmitted through the total reflection surface into the optical path conversion unit,
wherein the two solid-state light sources are arranged oppositely to each other, and wherein the first direction and the second direction are directly opposite to each other.

9. The illumination optical system according to claim 8, further comprising:
a first optical path conversion unit that includes a first total reflection surface for totally reflecting the light emitted from the first light guide; and
a second optical path conversion unit that includes a second total reflection surface for totally reflecting the light emitted from the second light guide.

10. The illumination optical system according to claim 8, wherein a refractive index of the optical path conversion unit is higher than any of those of the first light guide and the second light guide.

11. An illumination optical system, comprising:
two solid-state light sources;
a first light guide configured to guide light emitted from one of the two solid-state light sources in a first direction;
a second light guide configured to guide light emitted from another one of the two solid-state light sources in a second direction different from the first direction and then enter the light into a third light guide;

an optical path conversion unit including a total reflection surface for totally reflecting the light output from the first light guide to enter the light into the third light guide; wherein an incident light that enters the total reflection surface at an angle equal to or larger than a critical angle is totally reflected on the total reflection surface and incident light that enters the total reflection surface at an angle less than the critical angle is transmitted through the total reflection surface; and a reflection unit disposed oppositely to the total reflection surface via an air layer and configured to reenter light transmitted through the total reflection surface into the optical path conversion unit.

12. The illumination optical system according to claim 11, wherein a refractive index of the optical path conversion unit is higher than any of those of the first light guide and the second light guide.

13. The illumination optical system according to claim 12, wherein the refractive index of the first light guide and the refractive index of the second light guide are equal to each other.

14. A projection display apparatus, comprising:
an image forming element;
an illumination optical system configured to illuminate the image forming element; and
a projection optical system configured to project image light formed by the image forming element,
wherein the illumination optical system comprises the illumination optical system according to claim 11.

* * * * *